Jan. 1, 1935. H. G. RHODES 1,986,764
HYDRAULIC BRAKE
Original Filed June 6, 1931   2 Sheets-Sheet 1
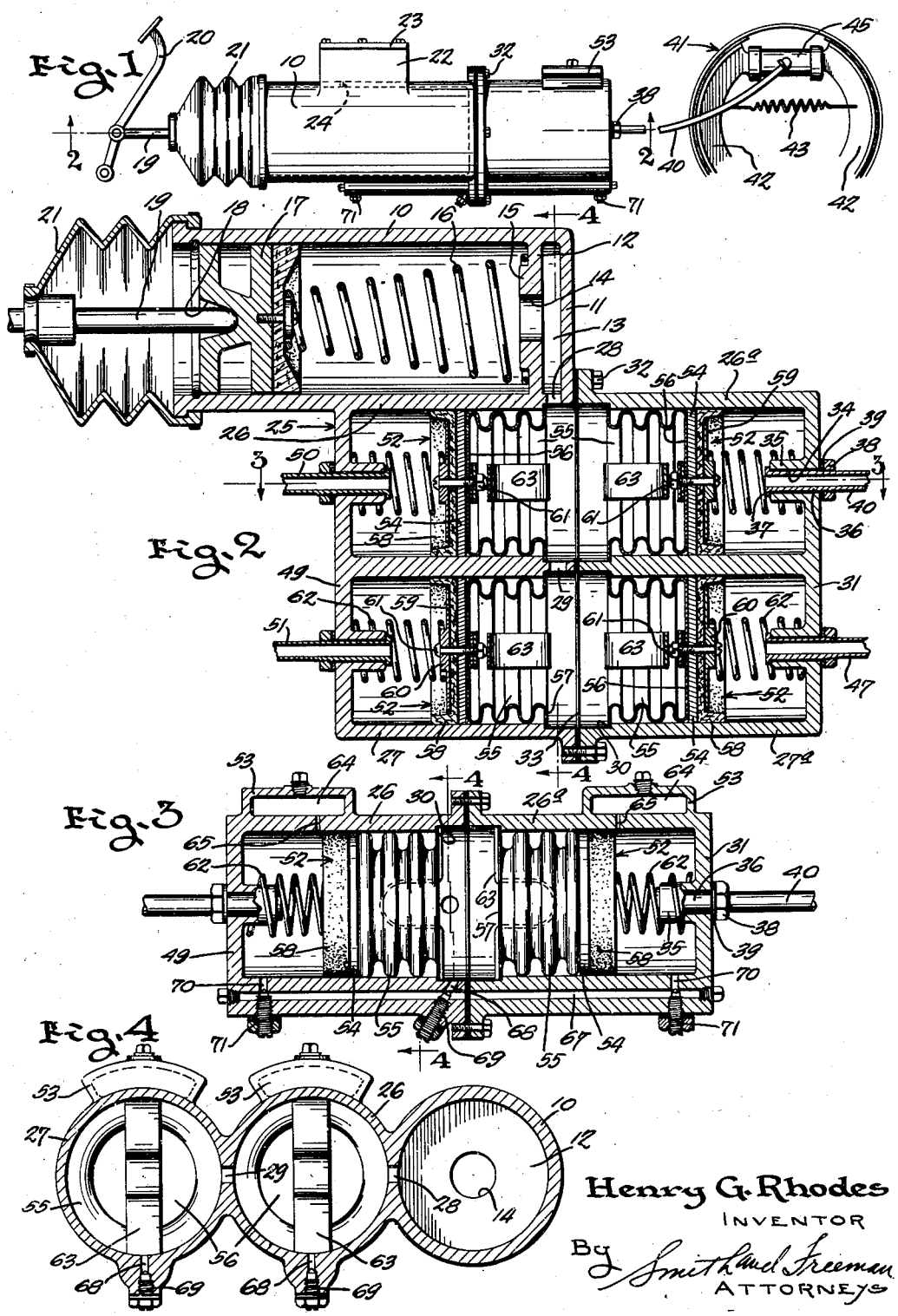
Henry G. Rhodes
INVENTOR Jan. 1, 1935.  H. G. RHODES  1,986,764
HYDRAULIC BRAKE
Original Filed June 6, 1931  2 Sheets-Sheet 2
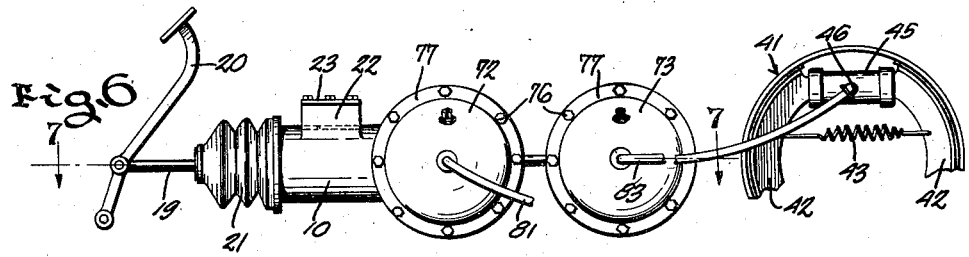
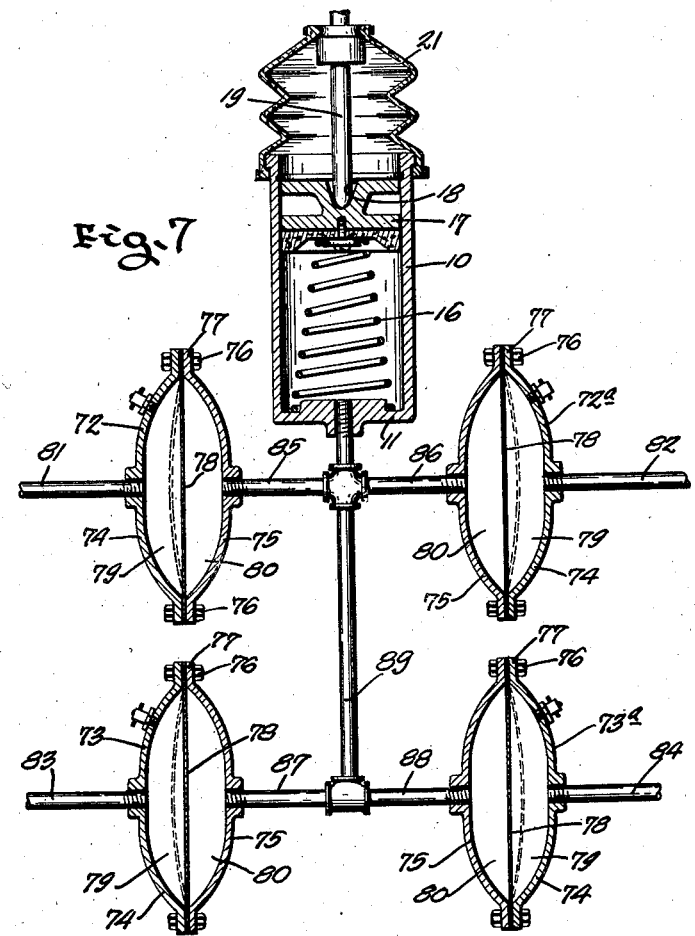
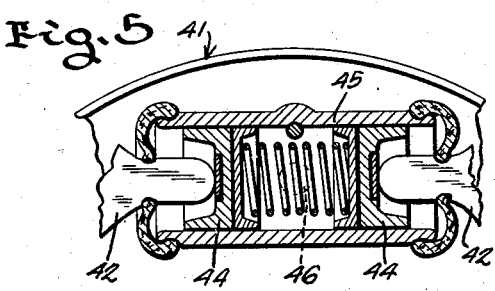
Henry G. Rhodes
INVENTOR Patented Jan. 1, 1935

1,986,764

UNITED STATES PATENT OFFICE 1,986,764

HYDRAULIC BRAKE

Henry G. Rhodes, Mayfield Heights, Ohio, assignor of one-half to Victor F. Germ, Lyndhurst, Ohio Application June 6, 1931, Serial No. 542,616
Renewed September 6, 1934

6 Claims. (Cl. 60—54.5)

This invention relates to hydraulic brakes, more particularly adapted for automobiles, and an object of the invention is to provide new and improved devices of this type.

In the drawings accompanying this specification and forming a part of this application, I have shown for purposes of illustration, two forms which my invention may assume, and in these drawings:

Figure 1 is a fragmentary side elevational view of an embodiment of the invention, Figure 2 is an enlarged horizontal sectional view corresponding substantially to the line 2—2 of Figure 1, Figure 3 is a vertical sectional view corresponding substantially to the line 3—3 of Figure 2, Figure 4 is a vertical sectional view corresponding substantially to the line 4—4 of Figure 2, Figure 5 is an enlarged fragmentary vertical sectional view of the wheel brake cylinder and pistons, Figure 6 is a fragmentary side elevational view of another embodiment of the invention, while Figure 7 is an enlarged horizontal sectional view corresponding substantially to the line 7—7 of Figure 6.

With particular reference to the structure shown in Figures 1 to 5, the invention comprises a master cylinder 10, having adjacent one end 11 an interior partition 12 forming a chamber 13, communicating with the cylinder 10 through an opening 14, surrounded by a rib 15, providing a seat for one end of a spring 16, the opposite end of which bears upon a piston 17 slidably disposed in the cylinder 10. The piston 17 at its outer side is provided with a recess 18 adapted for the reception of the inner end of a piston rod 19, connected to a brake pedal 20, and attached to the cylinder 10 and the piston rod 19 is a collapsible sealing member 21. Above the master cylinder 10 and integral therewith is a storage reservoir 22, having a removable cover 23, and communicating by means of a port 24 with the cylinder 10.

Associated with the master cylinder 10 is a brake actuating device, indicated generally by the reference character 25, and in the embodiment shown comprises four cylinders, 26, 26ª, 27, and 27ª. The cylinders 26 and 27 are preferably cast in side-by-side relation integrally with the master cylinder 10 and the cylinders 26ª and 27ª are also cast in side-by-side relation and secured to the cylinders 26 and 27 by bolts 32 and with suitable interposed packing 33, so that the cylinders 26ª and 27ª are in axial alignment with the cylinders 26 and 27 respectively. The outer ends of the cylinders 26 and 27 are closed by integral head portions 49 and the outer ends of the cylinders 26ª and 27ª are closed by integral head portions 31. The inner ends, however, of the several cylinders are open, so that the aligned cylinders are in communication with one another.

The cylinder head 31 is provided with an opening 34 arranged axially in line with the cylinder 26ª and having an inwardly extending boss 35 therearound, through which extends a fitting 36 having a flange 37 bearing against the end of the boss 35, and outwardly of the head 31 threaded for the reception of a securing nut 38, with interposed packing 39, the fitting 36 forming part of a flexible conduit 40 extending to one of the brake devices 41 associated with one of the front wheels of a vehicle, such as shown in Figures 1 and 5 of the drawings, and which comprises brake shoes 42 normally held disengaged by a spring 43, adapted to be engaged by a pair of opposed pistons 44, carried in a cylinder 45, and operatively disposed to bear against the ends of the brake shoes 42 when fluid is admitted to the cylinder 45 through the port 46 from the conduit 40. A second conduit 47 communicates axially with the adjacent end of the cylinder 27ª through the cylinder head 31 in the same manner as described in connection with the conduit 40, the conduit 47 leading to a brake device similar to 41 heretofore described, such device however being associated with one of the rear wheels of the vehicle.

The cylinder head 49 is provided with a conduit 50 communicating with the cylinder 26 leading to the other front wheel brake device of the vehicle, and with a conduit 51 communicating with the cylinder 27 and leading to the other rear wheel brake device of the vehicle, the conduits 50 and 51, and the brake devices adjacent the wheels being of the character heretofore described in detail.

Slidably mounted in each of the cylinders 26, 26ª, 27, and 27ª is piston 52, comprising a disk 54 to the outer surface of which is secured a cup-shaped washer 58, held in position by a plate 59, provided with a boss 60, and secured by a screw 61. A coiled expansion spring 62 is interposed between the plate 59 and the cylinder head and surrounds the bosses 35 and 60, and normally urges the piston 52 inwardly. The inward movement of each of the pistons 52 is limited by a resilient stop strip 63 supported in notches 30 formed in the interior wall of the associated cylinder.

A port 28 establishes communication between the chamber 13 of the master cylinder 10 and the space within the cylinders 26 and 26ª between the pistons 52 therein, and a port 29 establishes communication between this space and the corresponding space within the cylinders 27 and 27ª.

Fluid is prevented from leaking past the several pistons 52 by means of sealing members 55 of the expansible bellows type, each having an outer end wall 56 secured to the disk 54 by means of the screw 61 and with an inner circumferential flange 57 soldered within the notch 30 of the associated cylinder.

Auxiliary reservoirs 53 are provided for the cylinders 26, 26ª, 27, and 27ª, and each comprises an integral enlargement having a chamber 64, provided with a duct 65 communicating with the associated cylinder between the pistons 52 and the adjacent cylinder head, the ducts 65 being positioned to be open when the pistons 52 are retracted, but to be closed by said pistons immediately pressure is placed thereon.

The cylinders 26 and 26ª are also provided with a by-pass 67 communicating intermediate its ends by a port 68, controlled by a needle valve 69, with the space between the sealing members 55, and communicating also at each end by a port 70, controlled by a needle valve 71, with the space between the pistons 52 and the adjacent cylinder head. The cylinders 27 and 27ª are provided with a similar by-pass communicating therewith in a similar manner.

In preparing the system for use, the needle valves 69 and 71 are operated to open the ports 68 and 70, and fluid is introduced into the system through the reservoir 22, flowing thence through the port 24, into the master cylinder 10, thence through the port 28, through the port 29, through the by-pass 67 of the cylinders 26, 26ª, 27, and 27ª, passing thence into the ends of the cylinders, thence through the conduits 40, 47, 50, and 51, to the brake cylinders 45, sufficient fluid being introduced to entirely fill the system, and the reservoirs 53 and 22 as well. When filling has been completed the needle valves 69 and 71 are screwed home to close the ports 68 and 70, thereby separating the fluid in the system into segregated bodies, that contained within the reservoir 22, the master cylinder 10, and the spaces between the pistons 52, on the one hand, and those contained between the outer faces of the pistons 52 of the cylinders 26, 26ª, 27, and 27ª, and adjacent end walls of said cylinders, and in the conduits 40, 47, 50, and 51, and in the cylinders 45, on the other hand, so that the first body of fluid has no communication with the individual bodies associated with each brake device.

Normally, the piston 17 is held retracted by the spring 16 and the pistons 52 are likewise held retracted by the springs 62, and the brake shoes are held retracted by springs 43; and normally the fluid in the system is free from pressure. When the pedal 20 is depressed, the piston 17 forces fluid from the master cylinder between the pistons 52 in the several cylinders, thus causing outward movement of these pistons, which forces the fluid in advance of these pistons to the cylinders 45 to effect operation of the pistons 44, thus expanding the brake devices 41.

In the embodiment described, the entire system is equalized throughout and equalized pressure may be transmitted to the brake devices associated with all four wheels of the vehicle, and by reason of the segregation of the body of fluid contained within the master cylinder 10, such body of fluid can never be diminished by breakage or leakage in any of the flexible connections 40, 47, 50, and 51; consequently no fluid can be lost from the master cylinder 10 by reason of such breakage or leakage.

Should one of the flexible connections, flexible connection 40 for instance, leak, and only some fluid escape by reason of leakage, additional fluid will be supplied by the reservoir 53 to compensate for such leakage as may occur, and consequently prevent any impairment of the braking efficiency of the system. Should one of the flexible conduits, again 40, for example, entirely break, so as to permit all of the fluid in the conduit and adjacent end of the cylinder 26ª to escape, the associated piston 52, when pressure is applied to the pedal 20, will move to its extreme outer position, and be returned by the spring 62, in the same manner as though the fluid had not been lost, and without affecting equalization on the remaining three brake devices. In other words only one of the brake devices will be cut out and only that portion of fluid directly acting with reference to said braking device lost. Should the flexible connection 50, as well as the flexible connection 40, break, its associated piston 52 will move to its extreme outer limit, and only the portion of fluid directly associated therewith will be lost, this without affecting the equalized operation of the brake devices of the remaining two wheels of the vehicle, the reserve in the reservoir 22 compensating for the additional movement of the pistons 52. Should still another conduit, 47 for example, also break, there still will be one brake device operative, as will be understood. During any or all of the breakage which might occur as heretofore discussed, none of the major portion of the fluid contained within the reservoir 22, master cylinder 10, and between the pistons 52, will be lost.

In the embodiment of the invention disclosed in Figures 6 and 7, a plurality of fluid pressure responsive devices 72, 72ª, 73, and 73ª is employed, one of said devices being associated with each of the hydraulically operated brake devices. These fluid pressure responsive devices each comprises a pair of complementary concave members 74 and 75, secured together by bolts 76 engageable with peripheral flanges 77. A flexible diaphragm 78 is clamped between the flanges 77 of the members 75 and 74, so as to divide the interior of the device into two chambers 79 and 80. The chambers 79 of the several fluid pressure responsive devices communicate with their associated hydraulically operated brake devices through pipes 81, 82, 83, and 84, respectively, which are threaded into the concaved members 74, and the chamber 80 on the opposite side of the diaphragm 78 communicates through pipes 85, 86, 87, and 88, with a pipe 89 which in turn communicates with the master cylinder 10. It will be apparent in this particular construction that when the piston 17 in the master cylinder 10 is forced inwardly by the foot pedal 20, the fluid in the cylinder 10 will be forced into the chambers 80 of the several fluid pressure responsive devices, thus flexing the diaphragms 78 outwardly, as shown by dotted lines in Figure 7. This movement of the diaphragms 78 forces the fluid contained in the chambers 79 through the pipes 81, 82, 83, and 84 to the hydraulically operated brake devices associated with the wheels of the vehicle. By means of this construction the bodies of fluid, which operate the hydraulically operated brake devices, are separated entirely from each other and also from the body of fluid in the master cylinder 10, so that, if any one of the pipes 81, 82, 83, or 84 should develop a leak or become broken, only the fluid in such pipe will become depleted without in any way impairing the operation of the other brake devices.

It will be noted that the expansible bellows members 55, shown in Figures 1 to 4, and the flexible diaphragms 78, shown in Figures 6 and 7, positively prevent leakage of fluid between what I will term the operating and operated sides of the system, and consequently full operating pressure is at all times exerted against the pistons 52 and diaphragms 78.

Under the circumstances entire safety is provided, absolute equalization of pressure being obtained upon the brake devices so long as two or more are in operation, leakage in individual conduits may readily be taken care of, and breakage in a conduit or conduits results in the loss of a small localized body of fluid directly associated with the conduit in which breakage occurs.

Thus it will be apparent to those skilled in the art that I have accomplished at least the principal object of my invention, and it will be appreciated that the invention is susceptible to uses and has advantages other than those herein pointed out, and may be variously changed and modified without departing from the spirit of the invention; accordingly, those skilled in the art will realize that the embodiment herein disclosed is illustrative only and that the invention is not limited thereto.

I claim:

1. An equalizing multiple brake system, comprising: a master cylinder containing fluid and a main piston operating upon said fluid; a brake operating device having a fluid chamber; an auxiliary cylinder communicating with said master cylinder, and with the fluid chamber of said brake operating device; a flexible sealing member disposed in said auxiliary cylinder for confining a first body of fluid between said main piston and one side of said flexible sealing member, and for confining a second and independent body of fluid between said brake operating device and the opposite side of said flexible sealing member; and a reservoir carried by said master cylinder and containing a supply of fluid independent of said second body of fluid, but communicating with said first body of fluid, said reservoir being automatically operable to replenish deficiency of fluid in said first body of fluid; and upon braking action of said main piston fluid pressure in said first body of fluid is transmitted to said flexible sealing member, distending said sealing member, thereby transmitting said fluid pressure to said second body of fluid to effect operation of said brake operating device.

2. An equalizing multiple brake system, comprising: a master cylinder containing fluid and a main piston operating upon said fluid; a brake operating device having a fluid chamber; an auxiliary cylinder communicating with said master cylinder, and with the fluid chamber of said brake operating device; a flexible sealing member disposed in said auxiliary cylinder for confining a first body of fluid between said main piston and one side of said flexible sealing member; and confining a second and independent body of fluid between said brake operating device and the opposite side of said flexible sealing member; and a reservoir carried by said master cylinder and containing a supply of fluid independent of said second body of fluid, and having a duct communicable with said first body of fluid, said duct being closed by said main piston during operation of said brake system and normally unobstructed to automatically permit flow of fluid therethrough to replenish deficiency of fluid in said first body of fluid; and upon braking action of said main piston fluid pressure in said first body of fluid is transmitted to said flexible sealing member, distending said sealing member, thereby transmitting said fluid pressure to said second body of fluid to effect operation of said brake operating device.

3. An equalizing multiple brake system, comprising: a master cylinder containing fluid and a main piston operating upon said fluid; a brake operating device having a fluid chamber; an auxiliary cylinder communicating with said master cylinder, and with the fluid chamber of said brake operating device; a flexible diaphragm disposed in said auxiliary cylinder for confining a first body of fluid between said main piston and one side of said flexible diaphragm, and for confining a second and independent body of fluid between said brake operating device and the opposite side of said flexible diaphragm; and a reservoir carried by said master cylinder and containing a supply of fluid independent of said second body of fluid, and having a duct communicable with said first body of fluid, said duct being closed by said main piston during operation of said brake system, and normally unobstructed to automatically permit flow of fluid therethrough to replenish deficiency of fluid in said first body of fluid; and upon braking action of said main piston fluid pressure in said first body of fluid is transmitted to said flexible diaphragm, distending said diaphragm, thereby transmitting said fluid pressure to said second body of fluid to effect operation of said brake operating device.

4. An equalizing multiple brake system, comprising: a master cylinder containing fluid and a main piston operating upon said fluid; brake operating devices each having a fluid chamber; a plurality of auxiliary cylinders each communicating with said master cylinder, and with the fluid chamber of one of said brake operating devices; a flexible sealing member disposed in each of said auxiliary cylinders for confining a first body of fluid between said main piston and one side of said flexible sealing members, and for confining a second and independent body of fluid between said brake operating devices and the opposite side of said flexible sealing members; and a reservoir carried by said master cylinder and containing a supply of fluid independent of said second body of fluid, but communicating with said first body of fluid; a plurality of reservoirs each carried by one of said auxiliary cylinders, and containing a supply of fluid independent of said first body of fluid, but communicating with one of said secondary bodies of fluids, said reservoirs being automatically operable to replenish deficiency of fluid in said bodies of fluid; and upon braking action of said main piston fluid pressure in said first body of fluid is transmitted to said flexible sealing member, distending said sealing member, thereby transmitting said fluid pressure to said second bodies of fluids to effect operation of said brake operating device.

5. An equalizing multiple brake system, comprising: a master cylinder containing fluid and a main piston operating upon said fluid; brake operating devices each having a fluid chamber; an auxiliary cylinder having a pair of flexible sealing members disposed therein, spaced from each other and confined to reciprocation within a portion only thereof, said auxiliary cylinder having a port communicating with said master cylinder and with the space between said sealing members, said sealing members confining a first body of fluid between said main piston and the adjacent sides of said sealing members, said auxiliary cylinder communicating adjacent its ends with said brake devices, said sealing members confining a second and normally independent body of fluid between said brake operating devices and the opposite sides of said sealing members; and a reservoir carried by said master cylinder and containing a supply of fluid independent of said second bodies of fluids, but communicating with said first body of fluid, said reservoir being automatically operable to replenish deficiency of fluid in said first body of fluid; and upon braking action of said main piston fluid pressure in said first body of fluid is transmitted to said flexible sealing members, distending said sealing members, thereby transmitting said fluid pressure to said second bodies of fluids to effect operation of said brake operating devices.

6. An equalizing multiple brake system, comprising: a master cylinder containing fluid and a main piston operating upon said fluid; brake operating devices each having a fluid chamber; an auxiliary cylinder having a pair of flexible sealing members disposed therein, spaced from each other and confined to reciprocation within a portion only thereof, said auxiliary cylinder having a port communicating with said master cylinder and with the space between said sealing members, said sealing members confining a first body of fluid between said main piston and the adjacent sides of said sealing members, said auxiliary cylinder communicating adjacent its ends with said brake devices, said sealing members confining a second and normally independent body of fluid between said brake operating devices and the opposite sides of said sealing members; and reservoirs carried by said auxiliary cylinder one for each of said second bodies of fluids and containing a supply of fluid independent of said first body of fluid, but communicating with said second bodies of fluids, said reservoirs being automatically operable to replenish deficiency of fluid in said second bodies of fluids; and upon braking action of said main piston fluid pressure in said first body of fluid is transmitted to said flexible sealing members, distending said sealing members, thereby transmitting said fluid pressure to said second bodies of fluids to effect operation of said brake operating devices.

HENRY G. RHODES.